US008302980B2

(12) United States Patent
Scolaro et al.

(10) Patent No.: US 8,302,980 B2
(45) Date of Patent: Nov. 6, 2012

(54) ECCENTRIC STEERING AXIS STRUT TOP MOUNT

(75) Inventors: Christopher P. Scolaro, Bloomfield Township, Oakland County, MI (US); Jacek Marchel, Rochester Hills, MI (US)

(73) Assignee: GM Global Technology Operations LLC

( * ) Notice: Subject to any disclaimer, the term of this patent is extended or adjusted under 35 U.S.C. 154(b) by 144 days.

(21) Appl. No.: 12/977,362

(22) Filed: Dec. 23, 2010

(65) Prior Publication Data
US 2012/0161414 A1     Jun. 28, 2012

(51) Int. Cl.
*B60G 15/07* (2006.01)

(52) U.S. Cl. .......................... 280/124.155; 280/124.147

(58) Field of Classification Search ........... 280/124.154, 280/124.155, 124.145, 124.146, 124.147; 267/217, 219–221
See application file for complete search history.

(56) References Cited

U.S. PATENT DOCUMENTS

| 5,263,694 | A | * | 11/1993 | Smith et al. ................... 267/220 |
| 5,467,971 | A | | 11/1995 | Hurtubise et al. |
| 6,382,645 | B1 | | 5/2002 | Gravelle et al. |
| 7,364,177 | B2 | * | 4/2008 | Handke et al. ......... 280/124.147 |
| 7,370,869 | B2 | * | 5/2008 | Kang ....................... 280/86.754 |
| 2004/0100057 | A1 | | 5/2004 | Nicot et al. |

FOREIGN PATENT DOCUMENTS

GB      2347906 A    9/2000

* cited by examiner

*Primary Examiner* — Drew Brown

(57) ABSTRACT

An eccentric steering axis strut top mount providing a reduced spindle length. An axes eccentricity is provided by laterally shifting the steering axis with respect to the strut rod axis in a direction toward a vertical ray passing through the wheel center. The axes eccentricity results in an upper point of the kingpin axis being laterally shifted toward the vertical ray with the consequence of the spindle length being shortened.

14 Claims, 4 Drawing Sheets

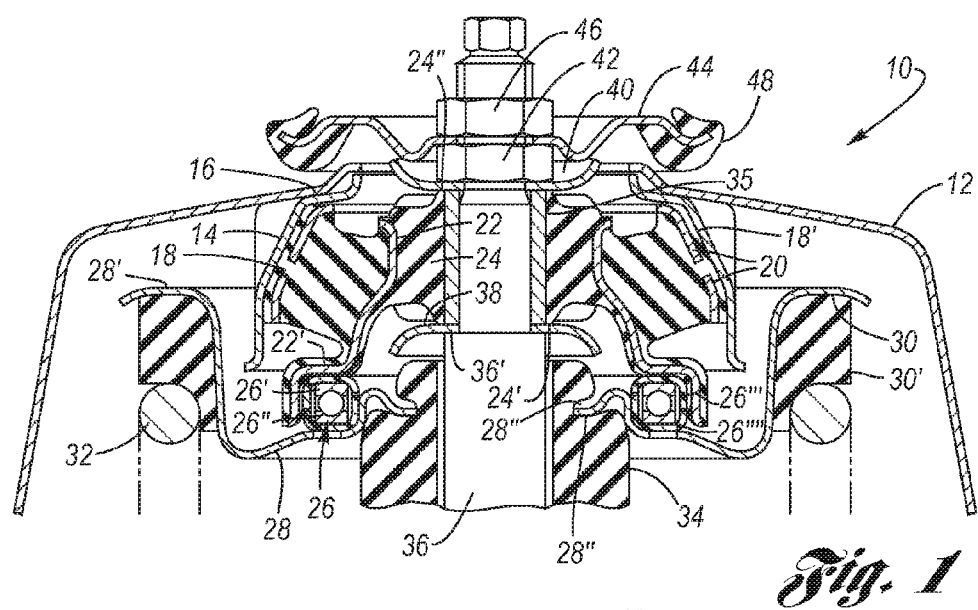

ECCENTRIC STEERING AXIS STRUT TOP MOUNT

TECHNICAL FIELD

The present invention relates to MacPherson strut-type motor vehicle suspension systems, and particularly to an eccentric steering axis strut top mount.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the integrated body/frame structure of the vehicle. In either jounce or rebound, a spring (i.e., coil, leaf, torsion, etc.) is incorporated with the body structure in order to provide a resilient response to the respective vertical movements of the wheel with regard to the vehicle body structure. However, in order to prevent wheel bouncing and excessive vehicle body motion, a shock absorber or strut is placed at the wheel to dampen wheel and body motion. An example of a MacPherson strut is disclosed in U.S. Pat. No. 5,467,971.

An exemplar a prior art single fastener strut top mount for a MacPherson strut which is manufactured by Adam Opel GmbH, a division of General Motors Company, Detroit, Mich., and is shown generally at 10 in FIG. 1. This prior art strut top mount 10 interfaces with a broad, annular strut tower 12 which at its lower end (not shown) is connected to the body structure of the motor vehicle. This prior art strut top mount 10 features an annular tapered dome 14 that is open downward nestingly within the tower 12, and is welded thereto at a conjoining 16 (the taper being smallest adjacent the conjoining, and largest distant from the conjoining). An annular outer rubber element 18 has an inclined outer surface 18' which abuts the dome 14. An annular metal insert 20 is preferably provided, for stiffening, within the outer rubber element 18 adjacent the dome 14. An annular stamped metal support shell 22 is adhered to the outer rubber element 18 in nested (i.e., in cross-section being oppositely disposed) relation to the dome 14; and an annular inner rubber element 24 is nested within and adhered to the support shell 22 in cross-section being in opposite disposition with respect to the outer rubber element 18, wherein the aforementioned adherences result from the molding process of the inner and outer rubber elements.

At an annular shelf 22' of the support shell 22, within an upper polymer housing 26''', is an upper race 26' of an annular bearing 26. The lower race 26'' of the bearing 26, within a lower polymer housing 26'''', is located at an annular spring bracket 28, wherein the upper and lower polymer housings mutually have a conventional labyrinthine seal interfacing, and wherein the spring bracket locates and handles loads from both the coil spring 32 and the jounce bumper 34. At an outer periphery 28' of the spring bracket 28, wherein the spring bracket has a diameter less than that of the strut tower 12, but exceeding the diameter of the dome 14, is formed a spring seat 30 having a rubber insulator 30a upon which abuts the coil spring 32. At an inner periphery 28'' of the spring bracket 28, adjacent the bearing 26, is a connection 28''' to the jounce bumper 34. A strut shaft 36 is reciprocally interfaced to a strut housing (not shown) in a conventional manner so as to provide damping as it reciprocates in relation thereto in response to jounce and rebound. A tubular metal sleeve 35 receives the strut shaft 36 at a shoulder 36' thereof, wherein the sleeve is adhered (as a result of the aforementioned molding process) to the inner rubber element 24. At the shoulder 36' of the strut shaft 36 is a lower washer 38 which abuts a lower end 24' of the inner rubber element 24 and a lower end of the sleeve 35. Abutting an upper end of the sleeve 35 is an upper washer 40 which also abuts an upper end 24'' of the inner rubber element 24, wherein the upper washer is held in place by a first nut 42 that is threaded onto the strut shaft 36. A retention washer 44 is mounted onto the strut shaft 36, and is held in place between the first nut and a second nut 46, which is also threaded onto the strut shaft. At the periphery of the retention washer 44 is a retention washer rubber element 48.

Spindle length is a metric used in motor vehicle front wheel suspension design, which indicates the distance from the kingpin axis to the wheel center. A minimal value for spindle length is desired for optimal suspension performance, as for example including the known benefits of reduced torque steer and reduced smooth road shake sensitivity. McPherson suspensions are desirable from a cost and mass standpoint, and the ability to minimize the spindle length is most often limited by the need to keep the strut body inboard of the wheel and tire.

Accordingly, what remains needed in the art is a MacPherson strut front wheel suspension having a minimized spindle length which overcomes the inherent packaging limitation imposed by conventional configuring of the strut body with respect to the wheel.

SUMMARY OF THE INVENTION

The present invention is a MacPherson strut front wheel suspension in which inherent packaging limitations are overcome by location of the steering axis in eccentric (or offset) relation to the strut rod axis, whereby the upper point of the kingpin axis is laterally shifted toward a vertical ray passing through the wheel center, thereby effectively shortening the spindle length to a degree not possible in the prior art.

The eccentric steering axis strut top mount includes a body attachment plate, a lower mount plate and a rotational bearing, wherein the rotational bearing rotatatively connects the body attachment plate to the lower mount plate. The body attachment plate is adapted to attach to a structural body component of the motor vehicle. The lower mount plate captures an elastomer body which, in turn, supports a centrally disposed strut rod sleeve through which the strut rod of the MacPerson strut passes. The rotational bearing has an outer race abutting the body attachment plate and an inner race abutting the lower mount plate.

The steering axis (identically the bearing axis) is disposed at the centerline of the bearing rotation, in eccentric disposition (offset in relation) to the strut rod axis which is disposed at the centerline of the strut rod when seated in the strut rod sleeve. In this regard the eccentricity is provided by location of the bearing axis in spaced relation away from the strut rod axis toward a vertical ray passing through the wheel center.

Thus, since the steering axis at the bearing centerline is moved closer to the vertical ray passing through the wheel center, the upper point of the kingpin axis, which intersects the steering axis, is concomitantly moved eccentrically, as well, toward the vertical ray. As such, the kingpin axis now intersects a horizontal ray passing through the wheel center at a shorter spindle length with respect to the wheel center than would otherwise be if the bearing and strut rod axes were superposed (as is conventional in the prior art).

Accordingly, it is an object of the present invention to provide an eccentric steering axis strut top mount which has a shortened spindle length for a front wheel motor vehicle MacPherson strut suspension.

This and additional objects, advantages, features and benefits of the present invention will become apparent from the following specification.

BRIEF DESCRIPTION OF THE DRAWINGS

FIG. 1 is a partly sectional side view of a prior art strut top mount.

FIG. 2 is a side elevational view of an eccentric steering axis strut top mount in accordance with the present invention.

FIG. 3 is a sectional view of the eccentric steering axis strut top mount, seen along line 3-3 of FIG. 2.

DETAILED DESCRIPTION OF THE PREFERRED EMBODIMENT

Figure 4:
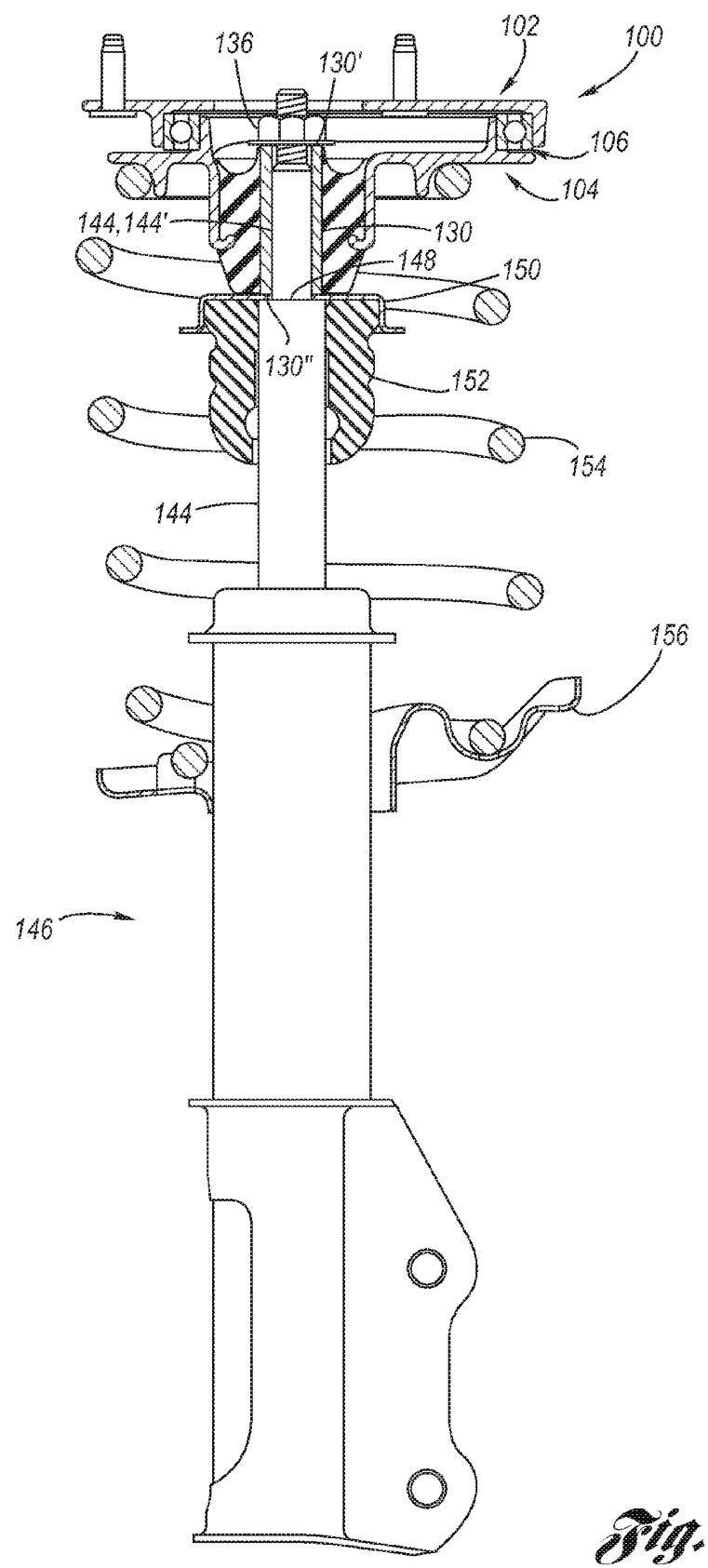
FIG. 4 is a sectional view of the eccentric steering axis strut top mount as in FIG. 3, including a side elevational view of a MacPherson strut, and sectional views of a coil spring and a jounce bumper.

Referring now to the Drawings, FIGS. 2 through 6 depict various aspects of the eccentric steering axis strut top mount 100 according to the present invention.

The eccentric steering axis strut top mount 100 includes a body attachment plate 102, a lower mount plate 104 and a rotational bearing 106, wherein the rotational bearing rotatatively connects the body attachment plate to the lower mount plate.

The body attachment plate 102 has preferably a generally circular periphery 108 and is structured for providing attachment to a structural body component of a motor vehicle body, as for example by a plurality of attachment studs 110 upstanding from a first side 102' of the body attachment plate, three of which being shown by way of exemplification. At the opposing second side 102" of the body attachment plate 102 is a depending circular attachment plate flange 112. A strut rod clearance opening 114 is formed in the body attachment plate 102.

The lower mount plate 104 has preferably a generally circular periphery 120. At a first side 104' of the lower mount plate 104 is an upstanding circular mount plate flange 122. At the opposing second side 104" of the lower mount plate 104 is a depending, tubular shaped elastomer mounting member 124 which firmly seats thereat an elastomer body 126, as for example rubber. In this regard, the elastomer mounting member 124 includes a distally disposed annular hook 128 which bites the elastomer body 126. Centrally disposed in the elastomer body 126 is a strut rod sleeve 130 which is bonded thereto, as for example via the molding process of the elastomer body. Additionally disposed at the second side 104" of the lower mount plate 104 is a coil spring seat 132 formed at the outer periphery of a coil spring flange 134 which is concentrically disposed with respect to the elastomer mounting member.

The rotational bearing 106 is disposed in pressed fit relation between the body attachment plate 102 and the lower mount plate 104. In this regard, the rotational bearing 106 has an outer race 106' firmly abutting the attachment plate flange 112 and an inner race 106" firmly abutting the mount plate flange 122, wherein the flanges can be reversed with respect to the bearing races. The rotational bearing 106 is configured to provide handling of both axial and radial loading, and is preferably of a ball bearing type.

The rotational bearing 106 has bearing axis 140 at its rotational centerline, wherein the bearing axis 140 is identically the steering axis 140' of the eccentric steering axis strut top mount 100. The strut rod sleeve 130 defines a strut rod axis 142 which is located at the centerline of the strut rod sleeve, and, as shown at FIG. 3, is also the centerline of the strut rod 144 of the MacPherson strut 146. In this regard, the strut rod clearance opening 114 is concentric with the strut rod axis 142.

Figure 6:
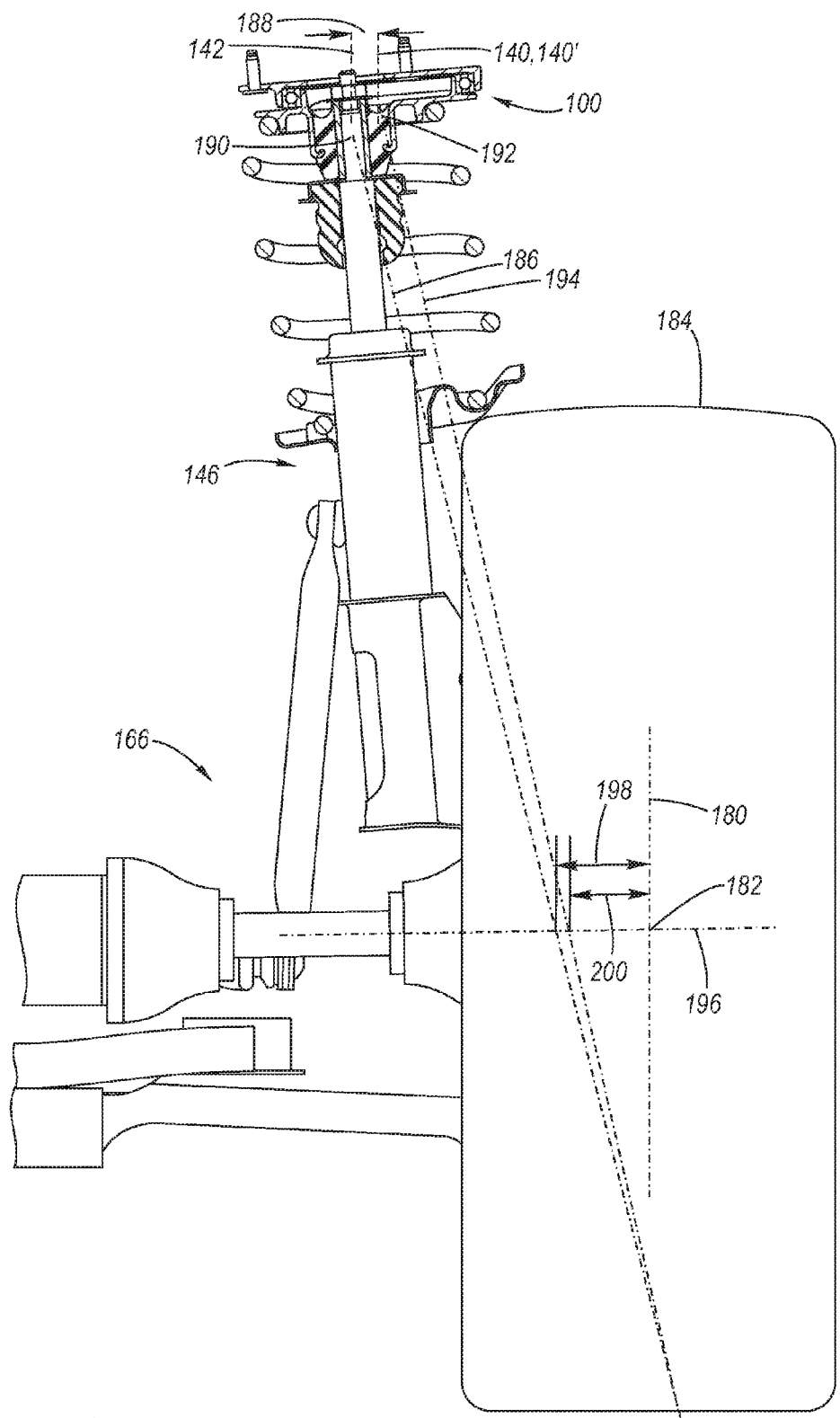
FIG. 6 is a view as in FIG. 4, additionally including wheel and suspension components and schematically depicting the kingpin axis and spindle length as per the prior art and the present invention.

As shown at FIG. 3, the bearing axis 140 is eccentrically disposed, that is laterally off set, from the strut rod axis 142. As indicated at FIG. 6, which will be discussed in further detail hereinbelow, this eccentricity is provided by location of the bearing axis 140 in spaced relation away from the strut rod axis 142 toward a vertical ray 180 passing through the wheel center 182 of the wheel 184 (see FIG. 6). The axes eccentricity 188 is for example about 20 mm, but can be otherwise depending on the suspension application.

Figure 5:
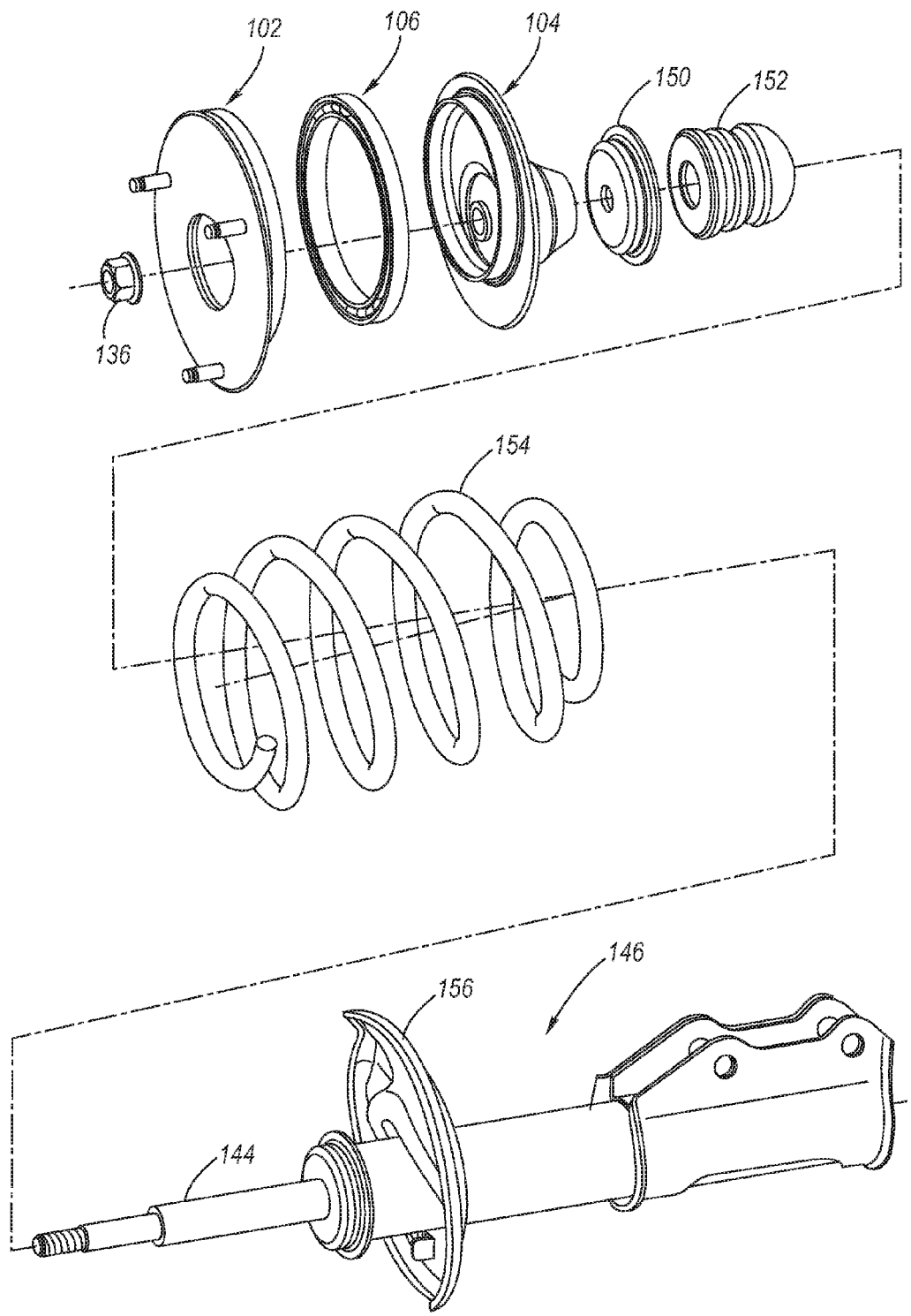
FIG. 5 is an exploded perspective view of the eccentric steering axis strut top mount, jounce bumper, coil spring and MacPherson strut, as per assembly of FIG. 4.

Turning attention now additionally to FIGS. 4 and 5 the interconnection of a MacPherson strut 146 with the eccentric steering axis strut top mount 100 will be detailed.

The strut rod 144 of the MacPherson strut 146 has a rod shoulder 148 and a reduced diameter portion 144' which is received by the strut rod sleeve 130, passing therethrough and being secured to an upper end 130' of the strut rod sleeve by a nut 136 threaded onto the strut rod. Disposed between a lower end 130" of the strut rod sleeve 130 and the rod shoulder is a jounce bumper plate 150 to which is attached a jounce bumper 152. A coil spring 154 extends between the coil spring seat 132 and a coil spring bracket 156 of the MacPherson strut 146.

Turning next to FIG. 6, how the eccentric steering axis strut top mount 100 minimizes the spindle length 190 will now be explained in detail, wherein the wheel 184 is connected to the MacPherson strut 146 via conventional suspension components generally shown at 166.

In a conventional top strut mount (as for example the prior art strut top mount 10 shown at FIG. 1), the steering axis (bearing axis) is superposed the strut rod axis, and the kingpin axis (see 186 in FIG. 6) has its upper point (see 190 in FIG. 6) intersecting the steering axis medially of the strut rod sleeve (the lower point intersects the lower ball joint, not shown).

In contradistinction to the prior art strut top mount, the eccentric steering axis strut top mount 100 has an axes eccentricity 188, whereby the steering axis 140' is shifted closer to the vertical ray 180 passing through the wheel center 182 of the wheel 184. Concomitantly, the upper point 192 of the kingpin axis 194 is moved laterally, as well, toward the vertical ray 180. As such, the kingpin axis 194 now intersects a horizontal ray 196 passing through the wheel center 182 at a shorter spindle length 200 with respect to the wheel center than would otherwise be if the bearing and strut rod axes were superposed, as per conventional strut top mount (see prior art spindle length 198 in FIG. 6). A "reduced spindle length" is defined by the spindle length 200 provided by the present invention being shorter than the conventional spindle length 198. By way of example, the spindle length 198 of a conventional strut top mount may be about 60 mm, whereas the spindle length 200 of an eccentric steering axis strut top mount 100 corresponding generally to the prior art strut top mount not having axes eccentricity according to the present invention, may be about 51 mm where the axes symmetry 188 is about 20 mm.

Accordingly, the eccentric steering axis strut top mount 100 decouples the strut rod from the top of the kingpin axis, permitting the kingpin axis to be moved outboard in relation to the motor vehicle, while avoiding the typical package limitations of the tire and wheel. Moving the upper point of the kingpin axis outboard shortens the spindle length and consequently provides the known benefits of reduced torque steer and reduced smooth road shake sensitivity.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An eccentric steering axis strut top mount for a motor vehicle, comprising:
    a body attachment plate;
    a lower mount plate;
    a strut rod sleeve having a sleeve centerline, said strut rod sleeve being connected to said lower mount plate, said strut rod sleeve defining a strut rod axis at said sleeve centerline; and
    a rotational bearing having a rotational centerline, said rotational bearing rotatably connecting said body attachment plate to said lower mount plate, said rotational bearing defining a steering axis at said rotational centerline;
    wherein said strut rod axis and said steering axis mutually define an axes eccentricity comprising said steering axis being spaced from said strut rod axis.

2. The eccentric steering axis strut top mount of claim 1, further comprising an elastomer body connected to said lower mount plate; wherein said strut rod sleeve is disposed in said elastomer body.

3. The eccentric steering axis strut top mount of claim 2, further comprising:
    a first side of said body attachment plate being adapted to connect to a body member of the motor vehicle;
    a second side of said body attachment member having an attachment plate flange;
    a first side of said lower plate mount having a mount plate flange;
    a second side of said lower plate mount being connected to said elastomer body;
    a first race of said rotational bearing firmly abutting one of said attachment plate flange and said mounting plate flange; and
    a second race of said rotational bearing firmly abutting the other of said attachment plate flange and said mounting plate flange.

4. A front wheel suspension for a motor vehicle, comprising:
    a wheel having a wheel center;
    a strut connected with the wheel, said strut having a strut rod; and
    an eccentric steering axis strut top mount for a motor vehicle, comprising:
        a body attachment plate;
        a lower mount plate;
        a strut rod sleeve having a sleeve centerline, said strut rod sleeve being connected to said lower mount plate, said strut rod sleeve defining a strut rod axis at said sleeve centerline, said strut rod being received by said strut rod sleeve; and
        a rotational bearing having a rotational centerline, said rotational bearing rotatably connecting said body attachment plate to said lower mount plate, said rotational bearing defining a steering axis at said rotational centerline;
        wherein said strut rod axis and said steering axis mutually define an axes eccentricity comprising said steering axis being spaced from said strut rod axis.

5. The front wheel suspension of claim 4, wherein said axes eccentricity further comprises:
    said steering axis being spaced from said strut rod axis by a lateral off set with respect to said strut rod axis toward a vertical ray passing through said wheel center.

6. The front wheel suspension of claim 5, wherein said axes eccentricity provides a reduced spindle length.

7. The front wheel suspension of claim 6, wherein said reduced spindle length is defined by a kingpin axis having an upper point which is laterally off set by said axes eccentricity toward the vertical ray.

8. The front wheel suspension of claim 7, further comprising an elastomer body connected to said lower mount plate; wherein said strut rod sleeve is disposed in said elastomer body.

9. The front wheel suspension of claim 8, further comprising:
    a first side of said body attachment plate being adapted to connect to a body member of the motor vehicle;
    a second side of said body attachment member having an attachment plate flange;
    a first side of said lower plate mount having a mount plate flange;
    a second side of said lower plate mount being connected to said elastomer body;
    a first race of said rotational bearing firmly abutting one of said attachment plate flange and said mounting plate flange; and
    a second race of said rotational bearing firmly abutting the other of said attachment plate flange and said mounting plate flange.

10. A front wheel suspension for a motor vehicle, comprising:
    a wheel having a wheel center;
    a MacPherson strut connected with the wheel, said strut having a strut rod; and
    an eccentric steering axis strut top mount for a motor vehicle, comprising:
        a body attachment plate;
        a lower mount plate;
        a strut rod sleeve having a sleeve centerline, said strut rod sleeve being connected to said lower mount plate, said strut rod sleeve defining a strut rod axis at said sleeve centerline, said strut rod being received by said strut rod sleeve; and
        a rotational bearing having a rotational centerline, said rotational bearing rotatably connecting said body attachment plate to said lower mount plate, said rotational bearing defining a steering axis at said rotational centerline;
        wherein said strut rod axis and said steering axis mutually define an axes eccentricity comprising said steering axis being spaced from said strut rod axis by a lateral off set with respect to said strut rod axis toward a vertical ray passing through said wheel center.

11. The front wheel suspension of claim 10, wherein said axes eccentricity provides a reduced spindle length.

12. The front wheel suspension of claim 11, wherein said reduced spindle length is defined by a kingpin axis having an upper point which is laterally shifted by said axes eccentricity toward the vertical ray.

13. The front wheel suspension of claim 12, further comprising an elastomer body connected to said lower mount plate; wherein said strut rod sleeve is disposed in said elastomer body.

14. The front wheel suspension of claim 13, further comprising:
 a first side of said body attachment plate being adapted to connect to a body member of the motor vehicle;
 a second side of said body attachment member having an attachment plate flange;
 a first side of said lower plate mount having a mount plate flange;
 a second side of said lower plate mount being connected to said elastomer body;
 a first race of said rotational bearing firmly abutting one of said attachment plate flange and said mounting plate flange; and
 a second race of said rotational bearing firmly abutting the other of said attachment plate flange and said mounting plate flange.

\* \* \* \* \*